(12) United States Patent
Bien (10) Patent No.: US 6,663,016 B2
(45) Date of Patent: Dec. 16, 2003

(54) APPLICATOR ASSEMBLY FOR APPLICATION OF ADHESIVES, SEALANTS AND COATINGS

(75) Inventor: Frank C. Bien, Apopka, FL (US)

(73) Assignee: Urecoats Technologies, Inc., Deerfield Beach, FL (US)

( * ) Notice: Subject to any disclaimer, the term of this patent is extended or adjusted under 35 U.S.C. 154(b) by 63 days.

(21) Appl. No.: 09/970,126

(22) Filed: Oct. 3, 2001

(65) Prior Publication Data

US 2003/0062427 A1 Apr. 3, 2003

(51) Int. Cl.$^7$ ................................................. B05B 1/24
(52) U.S. Cl. ..................... 239/130; 239/131; 239/133; 239/137; 239/416.1; 239/422; 239/428
(58) Field of Search ................................ 239/130, 131, 239/133, 135, 416.1, 422, 427.5, 428, 137; 222/146.5, 145.6, 608, 530, 538

(56) References Cited

U.S. PATENT DOCUMENTS

| | | | |
|---|---|---|---|
| 3,682,054 A | * | 8/1972 | MacPhail et al. ........... 239/304 |
| 4,529,127 A | * | 7/1985 | Huszagh ..................... 239/128 |
| 5,645,217 A | * | 7/1997 | Warren ........................ 239/135 |
| 6,102,304 A | * | 8/2000 | Gonitzke et al. ........... 239/135 |
| 6,109,826 A |   | 8/2000 | Mertes ........................ 404/95 |

FOREIGN PATENT DOCUMENTS

WO    WO 00/11111    *    3/2000

* cited by examiner

Primary Examiner—Gene Mancene
Assistant Examiner—Dinh Q. Nguyen
(74) Attorney, Agent, or Firm—Malin, Haley & DiMaggio, P.A.

(57) ABSTRACT

A melter, mixer and applicator system for applying coating or sealing compositions is disclosed. A diesel engine provides the motive force necessary to operate many of the components of the system. A tank surrounded by an internal heating system is provided for melting a first material. An insulated cabinet is provided and heated from heat generated by the internal heating system. The plumbing configuration is disposed within the heated cabinet for mixing the material heated within the tank with an additional material fed to the plumbing configuration by a proportioner pump. The output of this mixture serves as one of the inputs to the applicator. The other input to the applicator is another material fed directly from the proportioner pump. The proportioner, preferably provides the two materials running through it in a predetermined ratio amount with respect to each other.

20 Claims, 8 Drawing Sheets

APPLICATOR ASSEMBLY FOR APPLICATION OF ADHESIVES, SEALANTS AND COATINGS

BACKGROUND OF THE INVENTION

1. Field of the Invention

This invention relates to applicators for the handling and application of materials, and particularly to an applicator assembly for use in the in situ generation, preparation, mixing and application of compositions for use as coatings, sealants, adhesives, etc. The compositions can be used in many applications, including, but not limited to, roofing, coverings, and construction waterproofing applications.

2. Description of Related Art

Due to the nature of the materials used in forming bituminous polyurethane interpenetrating elastomeric network compositions, as well as other compositions, specialized equipment is required to prepare, mix and apply the materials to form the composition. This equipment must be portable so as to allow it to be taken to the job site or any other designated area.

Various applicators and devices for preparing materials, such as asphalt, are known. However, the prior art fails to provide for an applicator system, which, in addition to preparing asphalt, also permits mixing of the asphalt with other materials to form a composition, which is created just prior to application or in situ. It is therefore to the effective resolution of the shortcomings of the prior art that the present invention is directed.

BRIEF SUMMARY OF THE INVENTION

A melter, mixer and applicator system for applying coating or sealing compositions, or other compositions or material(s) is provided by the present invention. The various components of the applicator system are securely attached or mounted onto a frame for ease in transportation of the system. An internal combustion engine, such as a diesel engine, can be mounted on the frame and provides the motive force necessary to operate many or all of the functions and components of the system.

A tank surrounded by an internal heating system is provided for melting a first material, such as asphalt. An insulated cabinet is provided and heated from heat generated by the internal heating system. The plumbing configuration for the system is disposed within the heated cabinet for mixing the material heated within the tank with an additional material fed to the plumbing configuration by a proportioner pump. The output of this mixture serves, through a heated hose, as one of the inputs to the applicator, which is preferably a plural component spray gun, though such is not considered limiting. The other input to the applicator is another material fed directly from the proportioner pump. The proportioner, preferably provides the two materials running through it in a predetermined ratio amount with respect to each other. A pre-heater assembly can be disposed within the heated cabinet for heating the material fed from the proportioner prior to its mixing with the material from the tank.

The cabinet is preferably provided with an access door to provide easy access to the interior area of the cabinet and the various components contained within.

Storage racks can be provided along the sides of the system to store or house the various hoses used with the system during transit or when the system is not in use. The vertical height of the racks can be positioned such that the fenders covering the wheels can also be used to provided support to the hoses stored within the racks.

In use, a first material is heated in the tank. Once the material has reached a sufficient temperature, a pump will begin to recirculate or draw out the liquefied material and send such material to a static mixer for mixing with a second material which has been supplied in a predetermined portion from the proportioner. The mixed material is forwarded through a heated hose as a first input to the user operated applicator (e.g. spray gun). A second input to the applicator is provided directly from proportioner in its predetermined portion. The heated hose is coupled or connected to an electrical outlet powered by a generator. Through the use of a trigger on the applicator, the operator opens a valve in the applicator, to allow the combined material from both inlets to flow through onto the desired substrate or surface. Thus, the applicator system provides a novel pumping, metering, mixing, and spraying system.

Thus, the invention discloses a melter, mixer and applicator system for applying coating or sealing compositions. An internal combustion engine, such as a diesel engine, is used to provide the motive force necessary to operate many or all of the components of the system. A tank surrounded by an internal heating system is provided for melting a first material, such as asphalt. An insulated cabinet is provided and heated from heat generated by the internal heating system. The plumbing configuration for the system is disposed within the heated cabinet for mixing the material heated within the tank with an additional material fed to the plumbing configuration by a proportioner pump. The output of this mixture serves, through a heated hose, as one of the inputs to the applicator, which is preferably a plural component spray gun. The other input to the applicator is another material fed directly from the proportioner pump. The proportioner, preferably provides the two materials running through it in a predetermined ratio amount with respect to each other. A pre-heater assembly can be disposed within the heated cabinet for heating the material fed from the proportioner prior to its mixing with the material from the tank.

Accordingly, it is an object of the present invention is to provide a novel pumping, metering, mixing, and spraying system for plural material compositions.

It is another object of the present invention to provide a system for preparing plural material compositions at or near the site of application.

In accordance with these and other objects, which will become apparent hereinafter, the instant invention will now be described with particular reference to the accompanying drawing.

DETAILED DESCRIPTION OF THE INVENTION

As seen in the drawings, a melter, mixer and applicator system for applying coating or sealing compositions, or other compositions or material(s), is illustrated and generally designated as reference numeral 10. In the most preferred form, applicator system 10 can be transported on a frame 12 that is towable behind a vehicle. Alternatively, the various components of applicator system 10 can be provided on a truck, such as, but not limited to, a flat bed truck. Where a frame 12 is provided, frame 12 can be provided with a conventional trailer hitch 14, along with wheels 16 and fenders 17 covering the wheels, to form a trailer for applicator system 10. The various components of applicator system 10 are securely attached or mounted onto frame 12 such that it may readily be towed or transported to any required designation.

An internal combustion engine 18, such as, but not limited to, a diesel engine, can be mounted on frame 12 and provides the motive force necessary to operate many of the functions of applicator system 10, which will be discussed further below. Engine 18 preferably runs a conventional generator for generating electrical current, such as for electricity to one or more heated hoses used in conjunction with applicator system 10. A hydraulic pump and/or compressor 25 can also be driven by engine 18. A control box can be coupled with engine and serves to control engine 18, the hydraulic pump and/or compressor 25. An ignition system can be provided for starting engine 18. Engine 18, compressor 25, the generator and other components can be contained within a pivotable enclosure 19. Enclosure 19 can be noise insulated and lockable for security purposes. Additionally, a cooling fan 21 can also be provided for cooling engine 18. A muffler 30, such as a cowl muffler, can also be provided with engine 18. Engine 18 can be joined to frame 12 by rubber engine mounts to prevent vibration transfer. Engine 18 is preferably protected by a conventional integral engine management system including an alternator, oil pressure and water temperature shutdowns.

A tank 26 is provided, having one or more access covers 28. Tank 26 is a relatively large kettle made of a suitably strong material, which will withstand the repeated heating of various volatile materials as well as supporting the weight of a large volume of these materials. Preferably, surrounding tank 26 is an internal heating system. The heating system includes one or more burners which are supplied with a fuel, such as diesel or liquid propane gas. A fuel supply container 34 is provided on frame 12 to deliver fuel to the burner. The burner is directed into and in communication with a heating chamber. A fuel gauge can be provided for easy determination of the fuel level within container 34. The heating chamber preferably essentially surrounds tank 26 on all but its upper surface. Heat directed into the heating chamber from the burner effectively and efficiently heats tank 26 and its contents. A burner control can be provided to control the operation of the burner. A suitable tank and heating system is disclosed in U.S. Pat. No. 6,109,826, the disclosure of which is incorporated by reference.

A chimney 40 can form part of the heating system and is coupled to and in communication with the heating chamber. Chimney 40 vents the byproducts from the combustion of the burner out of the heating chamber in a controlled fashion. Chimney 40 may also be fluidly connected to and in communication with tank 26 via a chimney tube 42. As chimney 40 vents fumes from the combustion, a draw can be created which siphons off any gaseous material which may be trapped in an upper portion of tank 26, thus directing it from tank 26, through chimney tube 42 and out through chimney 40. Due to the elevated temperature of the fumes venting through chimney 40, the gaseous material siphoned from tank 26 is burned or otherwise consumed in chimney 40 so that the exhaust from chimney 40 can be relatively clean and odorless. However, a separate burner unit may also be incorporated into the chimney tube 42 for such purposes. This burner unit burns the byproducts produced in tank 26, thus purifying, to some extent, the emissions from tank 26.

Applicator system 10 also includes an insulated cabinet 44 adjacent to heating system 30. Cabinet 44 is a relatively large, empty chamber, which can be selectively heated by the burner within the heating chamber. Cabinet 44 houses a piping/hose configuration 120 for mixing the material heated and contained within tank 26 with an additional material fed through a wall of cabinet 44 by a pipe or hose 82. Heated cabinet 44 helps to prevent solidification of material flowing through plumbing configuration 120.

When heating cabinet 44, a vent/passageway 46 is at least partially opened to provide communication between a portion of the heating chamber and the interior of cabinet 44 to provide residual tank or kettle heat to heat up the interior of cabinet 44, pump assembly 60 and pre-heater assembly 80. Once vent 46 is at least partially opened, heat flows from the burner, through the heating chamber and into cabinet 44. While any appropriate type of control may be employed, a control arm attached to a vent cover portion or gate door 49 is preferably provided and connected approximate vent 46. By controlling the amount that vent 46 is opened by the positioning of gate door 49, the operator can effectively control or regulate the amount of heat that is allowed to enter cabinet 44 through vent 46 from the burner. The control arm preferably extends out through an opening in the top of cabinet 44. When the control arm is raised, it further opens vent 46. Where vent 46 is closed, no significant amount of heat is allowed to enter cabinet 44 from the heating chamber. To place vent 46 in its most opened position, the control arm is raised. The amount vent 46 is opened/closed is adjustable by moving the control arm to dispose cover portion 49 in various positions over vent 46. The control arm can be held in a desired position by a cooperation of one or more control arm teeth mating with an upper surface of cabinet 44.

In use, access cover 28 is opened and the desired material (s), such as a bituminous material or asphalt, is placed within tank 26. The burner 32 is ignited and heats tank 26 and its contents to a temperature sufficient to liquefy the material. For asphalt, this will usually require a temperature range between about 250°–500° F. (120°–240° C.).

Concurrently, an agitator can be located within tank 26 and constantly mixes the heated material(s). The agitator helps to assure an even distribution of the material and to prevent pockets of solidified material from forming inside tank 26. The agitator can be coupled to a hydraulic motor, which is in turn coupled to a hydraulic pump powered by engine 18. A shutoff system can be provided with the agitator to automatically turn off the agitator when access door 28 is opened. Raising door 28 can terminate hydraulic flow to the agitator motor to stop the mixing process. As the material is withdrawn from tank 26, more material can be added, if desired, within tank 26 so that a sufficient supply of material is maintained. The agitator can be a bidirectional hydraulically driven, vertical agitator with tow horizontal paddles and vertical risers.

During the course of heating the materials, various noxious fumes and smoke can be created. Thus, access cover 28 is generally kept closed to maintain the efficiency of the heating process. Therefore, any created fumes and smoke may be trapped within tank 26. In order to maintain a sufficient supply of material, an operator may inspect tank 26 and visually determine the level and/or condition of the material. To facilitate this visual inspection, chimney 40 of heating chamber 38 can be in communication with tank 26 via chimney tube 42 at a point above the level of the mixture/material within tank 26. As discussed above, any fumes and smoke will be drawn out of tank 26 and vented through chimney 40. Without the use of chimney tube 42, cover 28 must be opened for a sufficient time period to allow the fumes and smoke to clear. Leaving cover 28 open for any extended time period may permit a large amount of heat to escape, thus seriously reducing the efficiency of the heating system. Therefore, chimney tube 42 also serves to reduce the amount of time access cover 28 must remain open, which increases the efficiency of the heating system.

Figure 1:
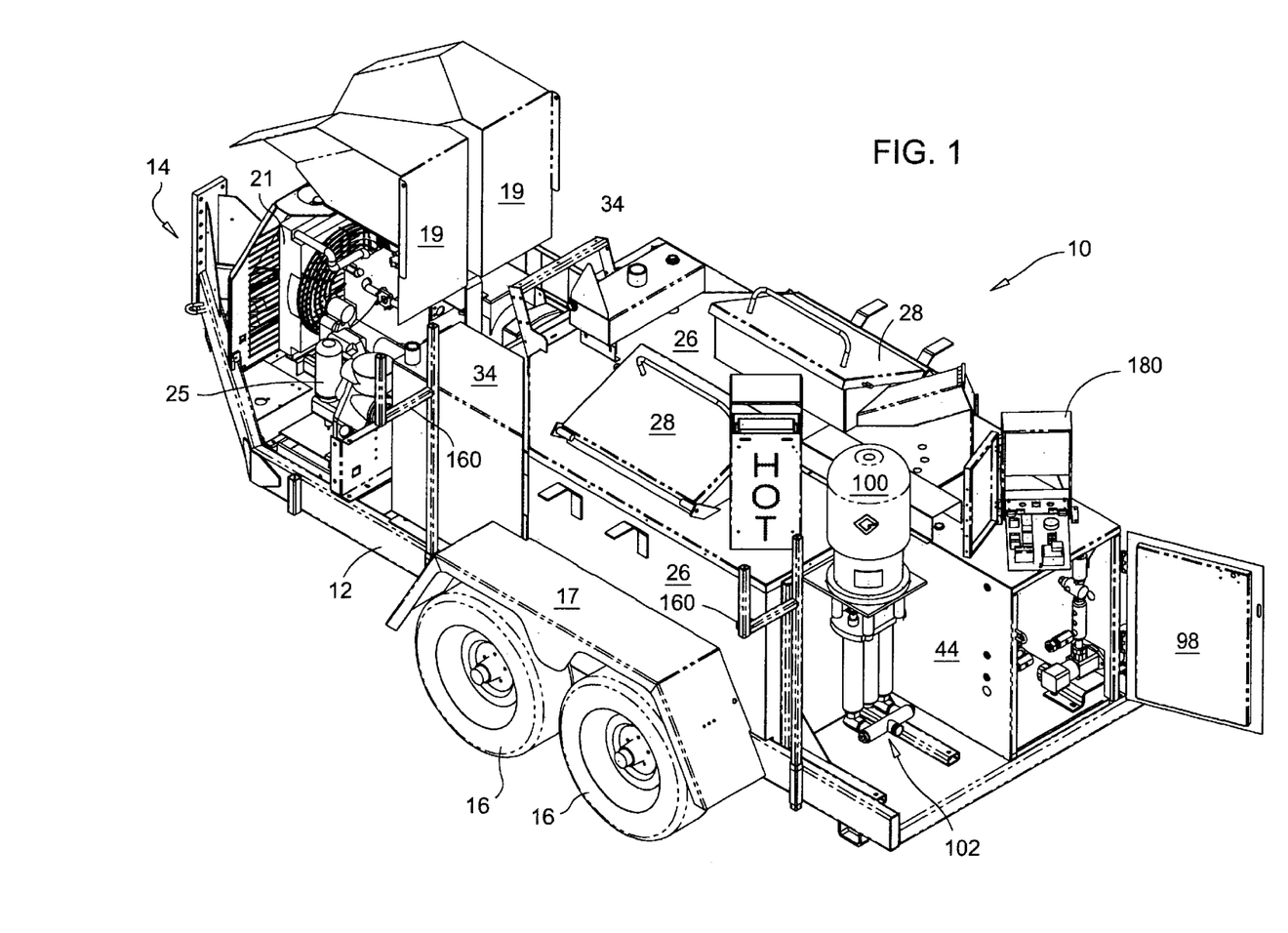
FIG. 1 is a perspective view of the present invention applicator system.
Figure 2:
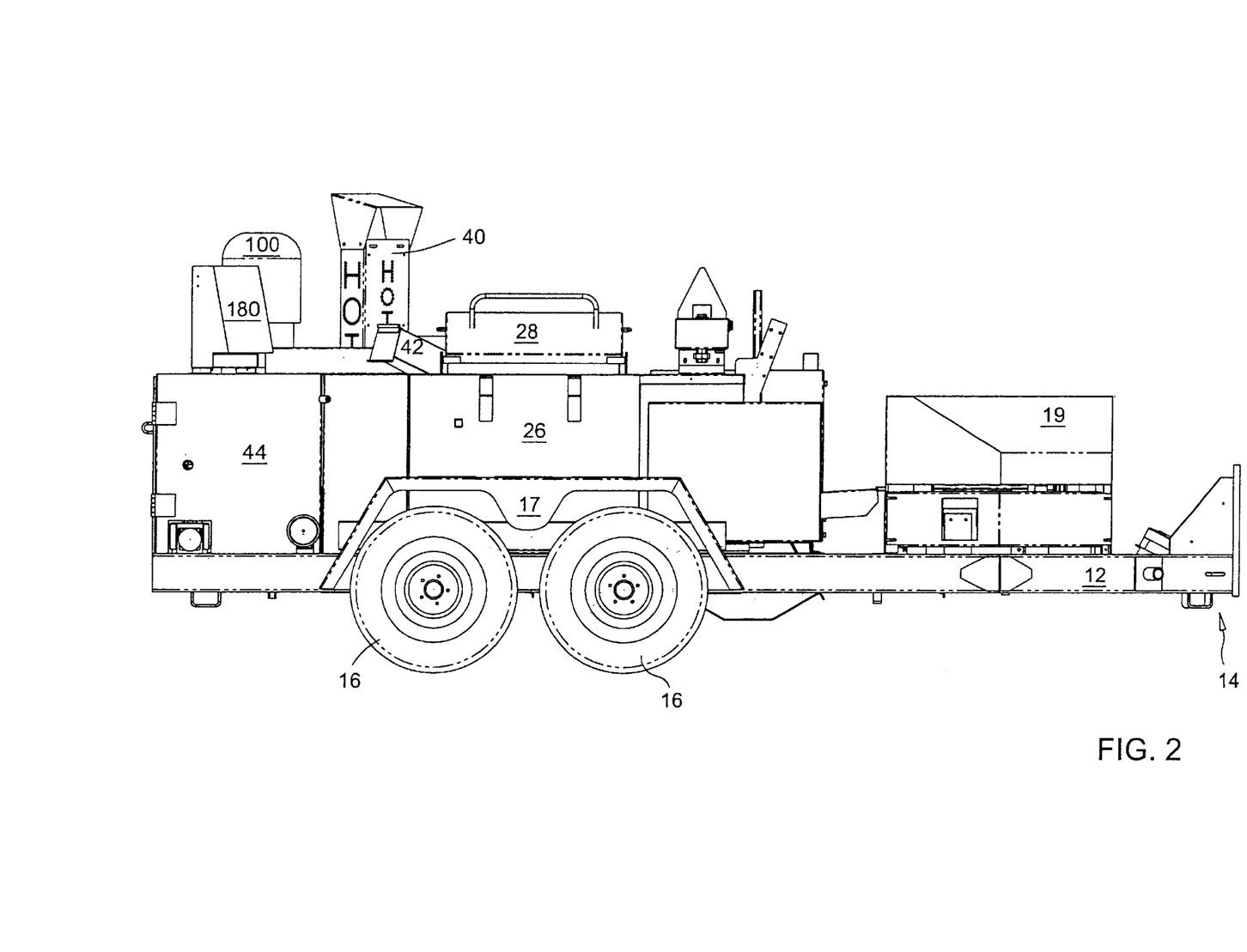
FIG. 2 is a right side elevational view of the applicator system of FIG. 1.
Figure 3:
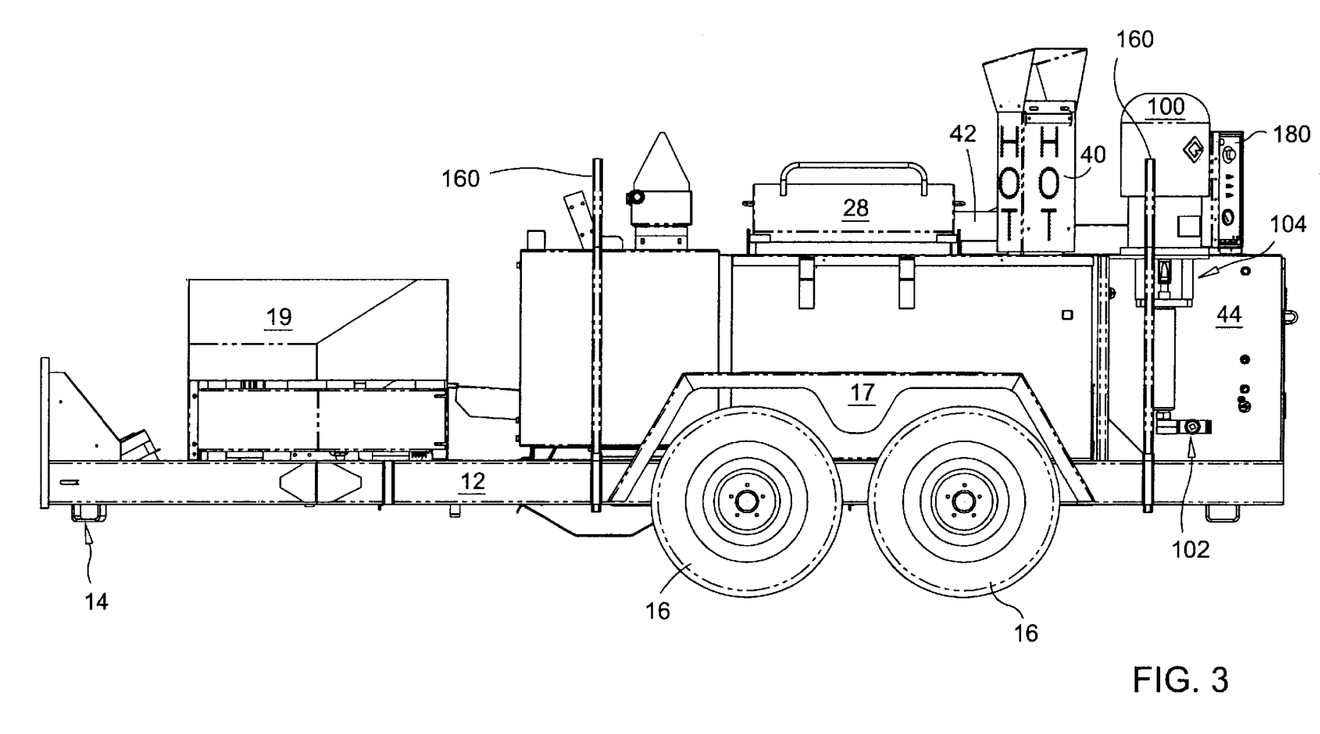
FIG. 3 is a left side elevational view of the applicator system of FIG. 1.
Figure 4:
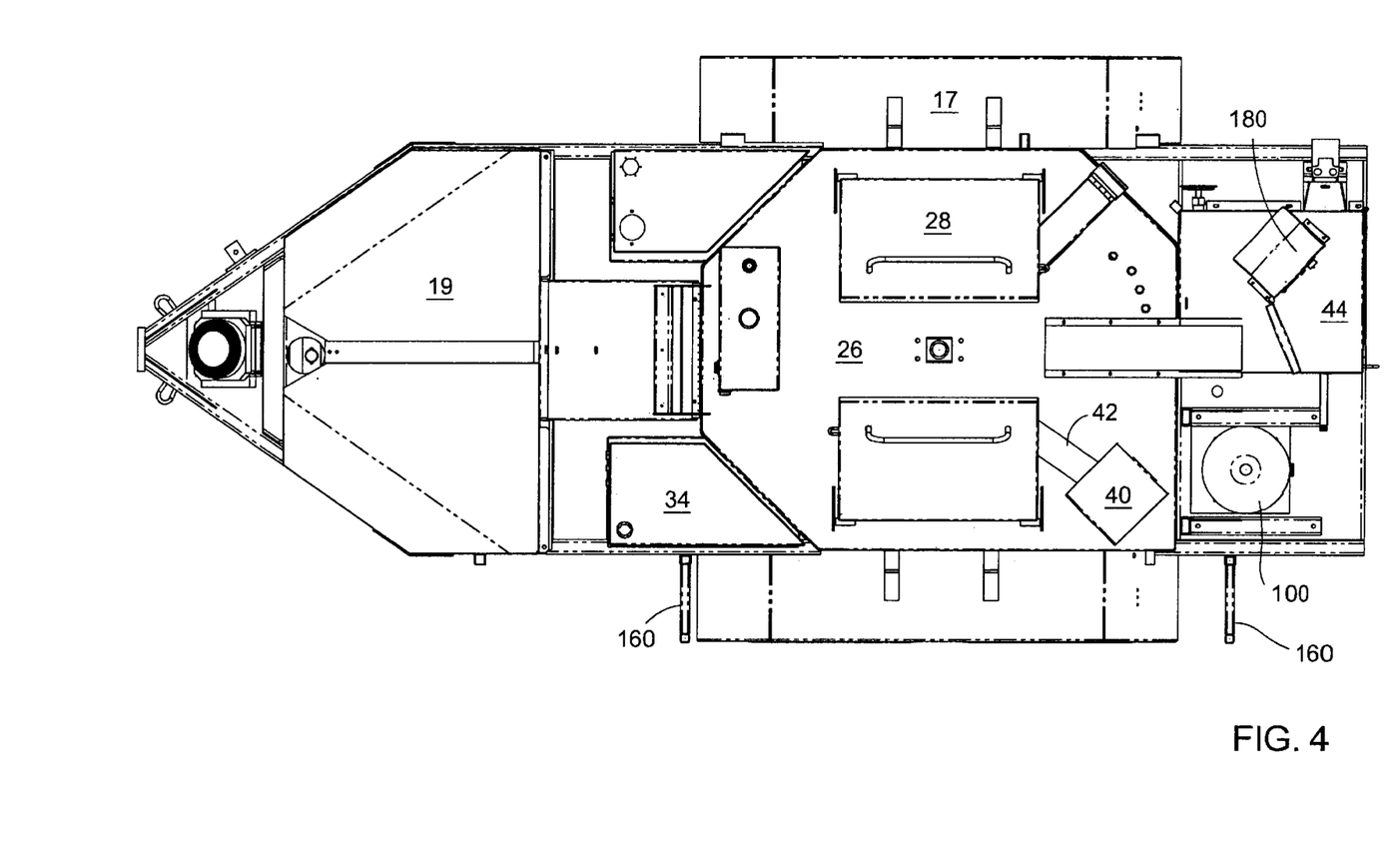
FIG. 4 is a top view of the applicator system of FIG. 1.
Figure 5:
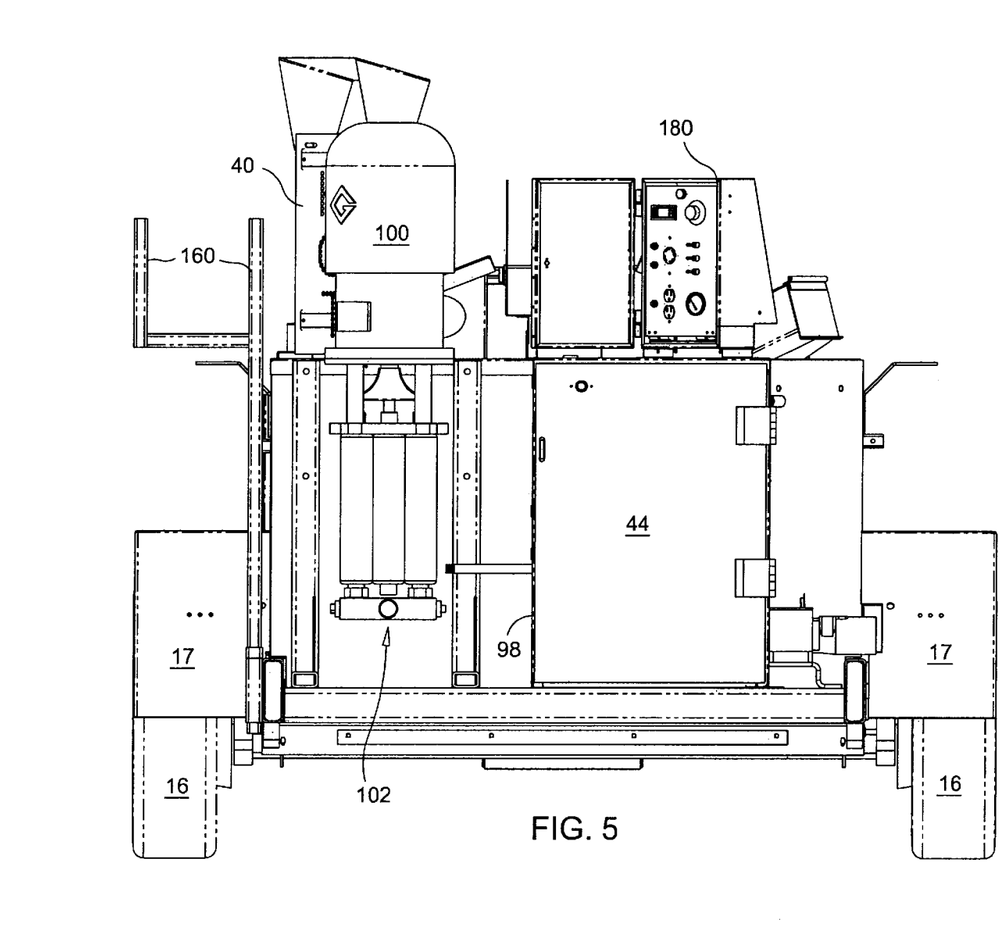
FIG. 5 is a back elevational view of the applicator system of FIG. 1.
Figure 6:
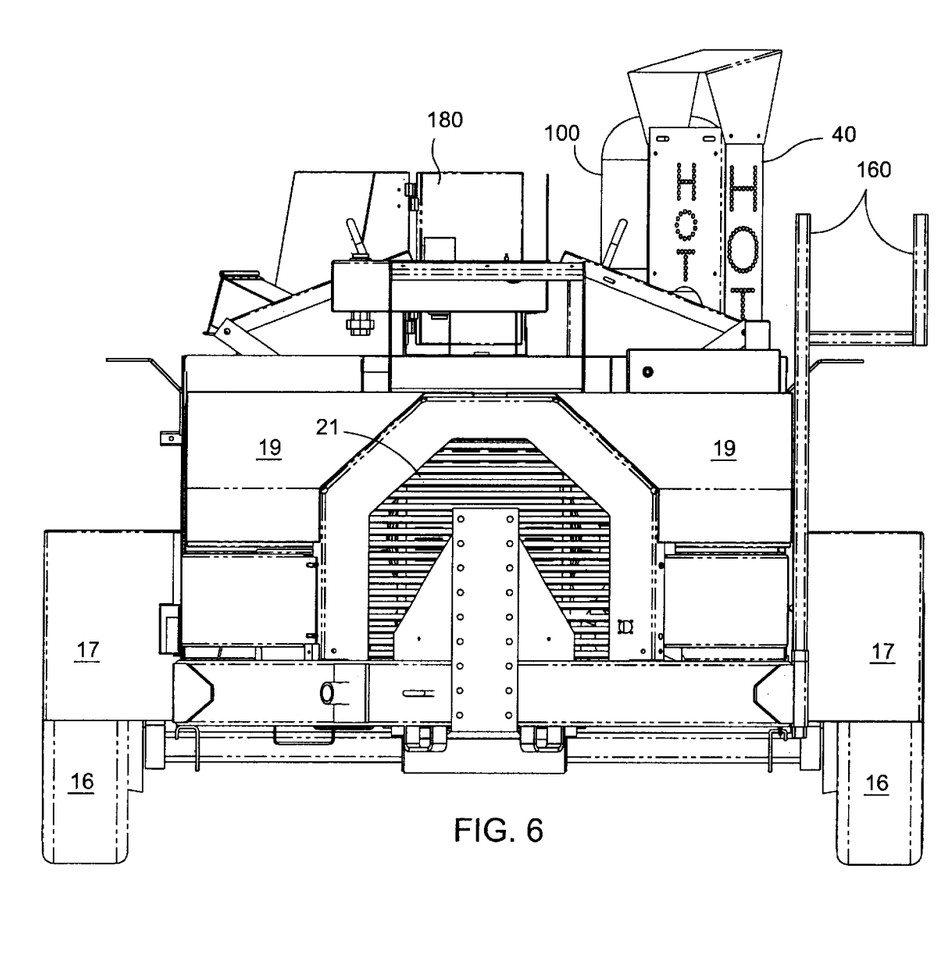
FIG. 6 is a front elevational view of the applicator system of FIG. 1.
Figure 7:
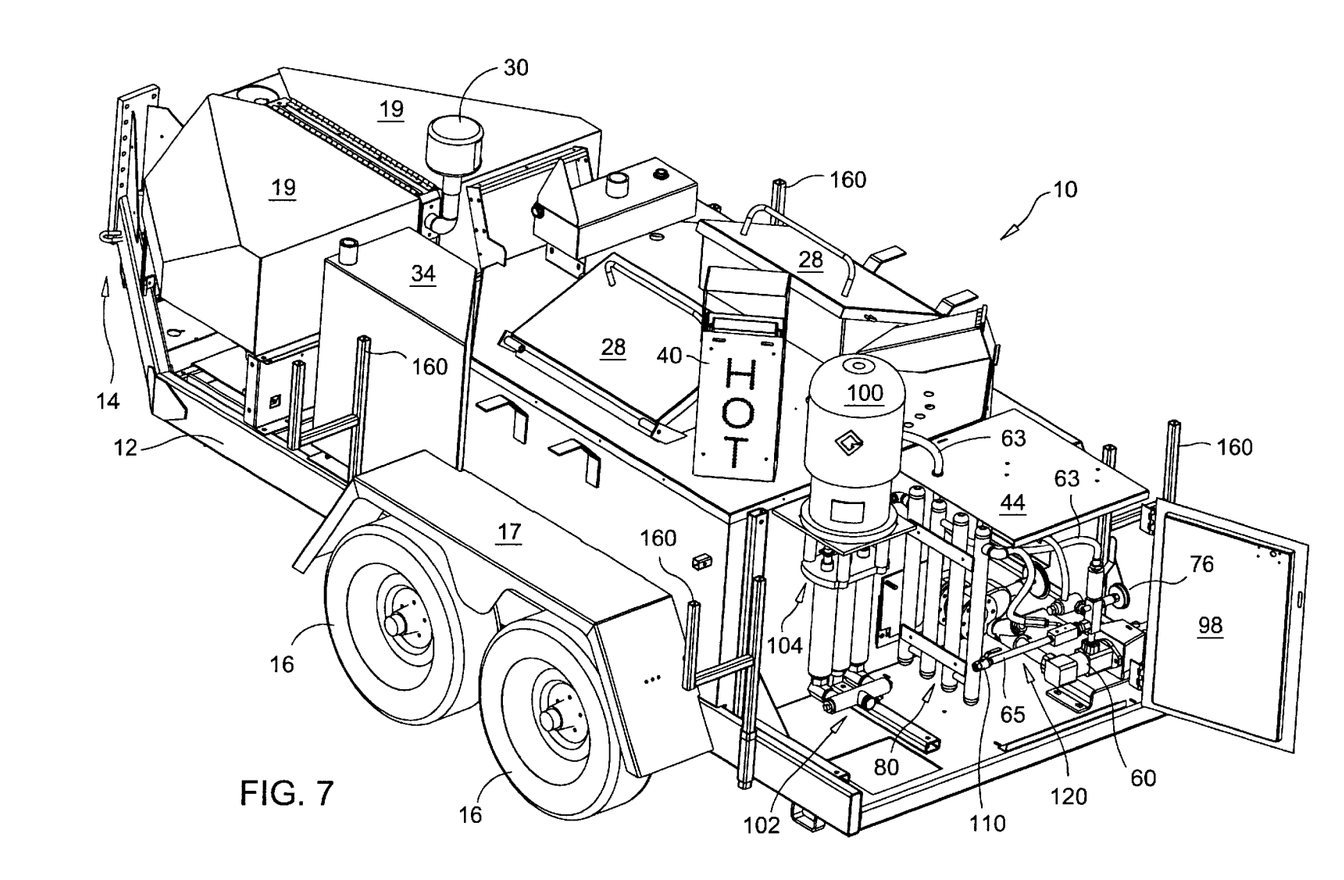
FIG. 7 is a further perspective view of the applicator system of the present invention.
Figure 8:
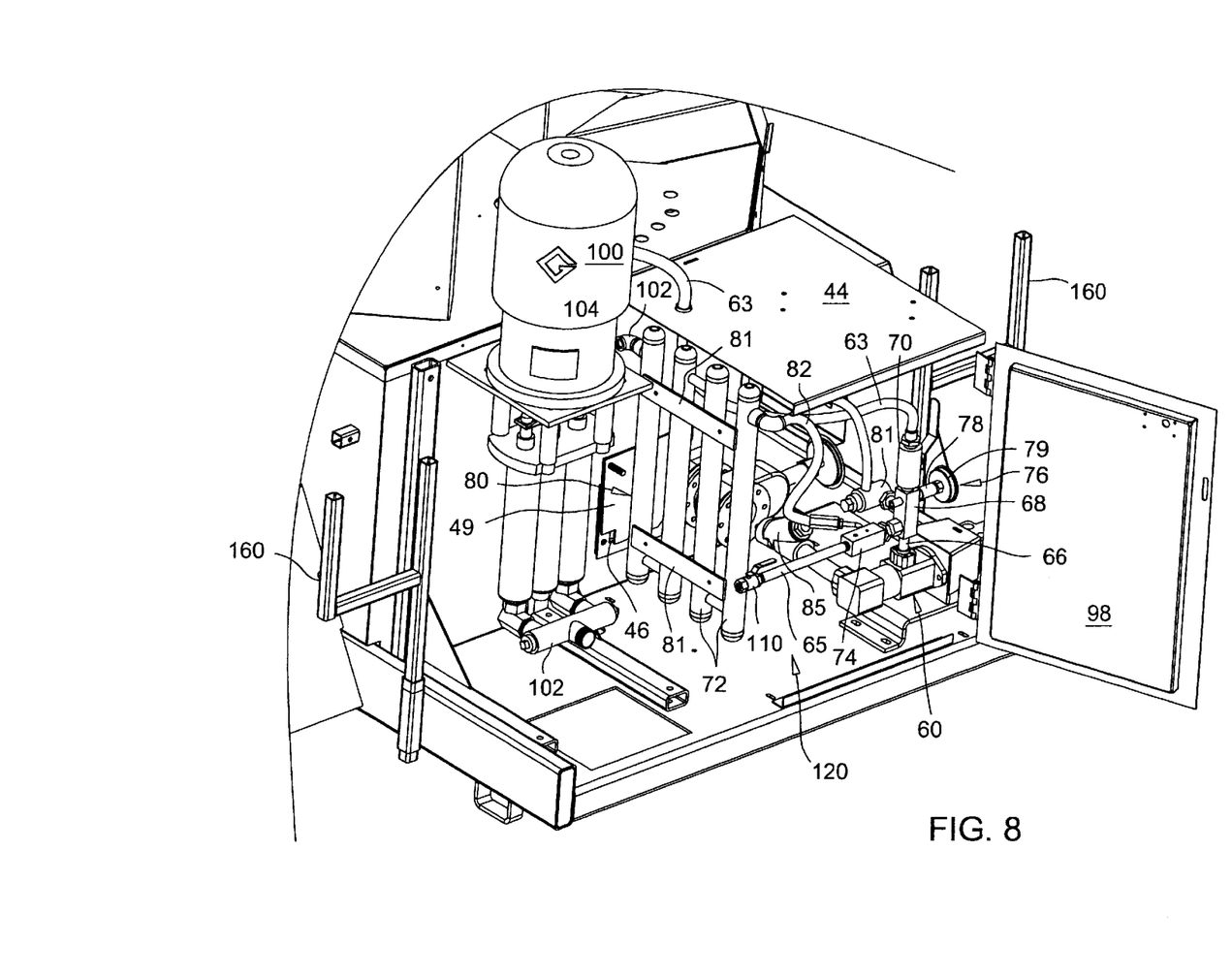
FIG. 8 is a perspective view of preferred plumbing configuration for the applicator system of the present invention.

FIG. 8 best illustrates a plumbing configuration 120 for the present invention. For purposes of illustration, the sidewalls of heated cabinet 40 have been removed in this Figure and in FIG. 7. A recirculating pump assembly 60 and inlet valve 62 can be located within cabinet 44. Pump assembly 60 can include a helical gear pump coupled to a hydraulic motor, though such is not considered limiting. An inflow pipe not shown is coupled between inlet valve 62 and tank 26 and provides communication between such components. Pump 60 is conventional and is used to pump the material (e.g. bituminous material, asphalt, e.g.) from tank 26. Pump 60 can be also be used to circulate cleaning material (i.e. mineral spirits) for cleaning or flushing various portions of plumbing configuration 120 for maintenance purposes. Pump 60 can be either continuously or systematically actuated to draw the liquefied material from tank 26, through pump 60 and then, in some instances, deliver it at least partially back to tank 26 through return pipe/hose 63. This serves to bring heated material to pump 60, which helps to heat pump 60 and also prevents any of the liquefied material from settling within pump 60. When the operator desires to use the applicator (i.e. sprayer, spray gun, etc.), this recirculation is minimized thus directing a majority of the fluid flow through pump 60 into static mixer 65, where it is mixed with a second material (i.e. polyol, etc.) prior to delivery to the applicator.

Inlet valve 62 can act as a "shut of" valve and allows material to flow from tank 26 to pump 60. The inflow pipe is preferably positioned at or near the bottom of tank 26 to enable the pressure generated by the volume of material disposed within tank 26 to assist pump 60 in drawing liquefied material through inflow pipe 62. The inflow pipe can be positioned at an angle. Coupled to the outlet line/pipe 66 of pump 60 is a junction 68 which preferably joins several components including material circulation (by-pass) valve 70, material check valve/mixing block 74 and material thermometer assembly 76. Though not shown a pressure assembly, including a pressure gauge, can also be included within the configuration.

By-pass valve 70 allows at least some of the material received from tank 26 to be pumped back to tank 26 through return pipe, hose or tube 63. Outflow pipe 63 is a return line that leads back to tank 26. Valve 70 can be of a differential type to allows the operator to set the flow rate of material returning back to tank 26. When the static mixer 65 is occluded (either because outlet valve 110 is closed and/or a valve of the applicator (e.g. spray gun) of a hose attached to valve 110 is closed), pump 60 can be placed in a recirculation mode. In this mode, pump 60 draws liquefied material out of tank 26 through the inflow pipe and returns it to tank 26 through outflow pipe or hose 63. The recirculation can be generally continuous or intermittent. The recurrent flow of the liquefied material through pump 60 prevents any of the material from settling long enough to cool and solidify during normal operation. However, the heated insulated cabinet 44 also helps to prevent the material from cooling and solidifying.

Valve/block 74 serves as the entry point from the material received through pre-heater assembly 80 and hose 82. This material is added to the material received from tank 26 for mixing within static mixer 65. Valve/block 74 also serves to prevent any material received through hose 82 from entering pump 60. Thus, the inlets to valve/block 74 are the material flowing through hose 82 and the material flowing from pump 60 which are both fed from valve/block 74 to static mixer 65. Static mixer 65 serves as the supply line, through valve 110, to the applicator for the mixed material. Thermometer assembly 76 includes a pipe/line 78 attached at one end to junction 68 and at its opposite end to thermometer gauge 79. Gauge 79 can be located within cabinet 44 or protrude through an opening in cabinet 44. Where protruding through, the opening can be sealed to help prevent heat from escaping. Gauge 79 indicates the temperature of the material from pump 60 as it flows. The pressure gauge, if provided, indicates the pressure of the material from pump 60 as it flows.

A material PSI relief valve 81 can be provided and connected to be in communication with junction 68. Relief valve 81 allows material from tank 26 to flow back to tank 26 if the heated hose incurs backpressure. Various filters or strainers can be provided within the plumbing configuration, including, but not limited to, filter/strainer 85 which filters material from tank 26 before it reaches pump 60.

A check valve 83 is preferably in communication with hose 82 and serves to prevent any material received from tank 26 from entering hose line 82. Hose 82 is preferably connected at an opposite end to pre-heater 80. Pre-heater 80 heats material flowing in from proportioner 100 via hose/line 102 which is attached at one end to an outlet of proportioner 100 and at an opposite end to the inlet of proportioner 100. Preferably, pre-heater 80 consist of a series of tubes 72 that are in communication with each other. Pre-heater 80 is preferably mounted to a sidewall within the interior of cabinet 44 by one or more bracket assemblies 81 or other conventional attachment devices. Tubes 72 are preferably constructed from steel, metal or any other material capable of heating to a desired temperature. Tubes 72 preferably heat radiantly from heat entering into cabinet 44 through vent 46. The first end of hose 82 is connected to the outlet of pre-heater assembly 80. It should be noted that hoses, piping and/or tubing can be used interchangeably for the various components of plumbing configuration 120. Additionally, system 10 is provided with conventional metal, aluminum, plastic and/or plumbing connectors for connecting the various hoses, pipes and tubes of and used with the present invention.

Proportioner 100 is used to provide or pump in predetermined ratios of certain materials for the desired composition. Proportioner 100 is powered by compressor 25, acts as a pump and is provided with an inlet area 102 and an outlet area 104. A first conventional hose or other elongated tube (not shown) is preferably connected at a first end to a first connector of inlet area 102 and at a second end to a first drum or other receptacle containing a first material, such as, but not limited to, a polyol. A second conventional hose or other elongated tube (not shown) is preferably connected at a first end to a second connector of inlet area 102 and at a second end to a second drum or other receptacle containing a second material, such as, but not limited to, an isocyanate or other hardener. The pump component of proportioner 100 draws the materials in the desired set or programmed ratio amount through their respective hoses from their respective drums. The present invention is not limited to any specific ratio setting for proportioner 100 and all various combinations (e.g. 4 to 1, 3 to 1, etc.) can be used and are considered within the scope of the invention.

The desired ratio of the first material is fed to the inlet of pre-heater assembly 80 from proportioner 100 through hose 102, which extends through an opening in cabinet 44. The opening is preferably sealed to help prevent heat from escaping from within cabinet. Hose 102 is connected at a first end to a first connector of outlet area 104 and at a second end to the inlet of pre-heater 80. The desired ratio of the second material is fed as an input to the applicator (e.g. spray gun) by a conventional hose. The hose is connected at a first end to a second connector of outlet area 104 and at a second end to a first inlet attachment point of the applicator.

As a second input to the applicator, a heated hose is attached at a first end to an outlet valve 110, which preferably protrudes out of cabinet 44 and is in communication with and connected or coupled to static tube 65. A second end of the heated hose is connected at a second inlet attachment point of the applicator. A third inlet attachment point can be provided on the applicator for attachment of a solvent flush line which is attached at an opposite end to a receptacle containing cleaning material such as mineral spirits. The flush line is provided for cleaning the applicator.

The hose used to deliver the material mix from outlet valve 110 to the applicator (e.g. spray gun, etc.) is preferably heated and can be any conventional type of heated hose. One embodiment can include a heating element, which surrounds the hose and a heating unit, which powers and controls the heating element. The heated hose can be heated by a sheath, which surrounds the hose. As an example, a heating element may be woven into the sheath, and as it is energized, it generates thermal energy, which is transferred through the sheath to the hose. In one preferred embodiment, the heating element can be an electrical coil, which can be energized by plugging into an electrical outlet of a junction box powered by the generator (i.e. receives electric current from the generator). The heating element can generate an electrical current through a wire (or wires) that is coiled about the outer circumference of the hose. The hose is preferably heated right up to its connection with coupling/outlet valve 110 on one end and the applicator on the other end. However, any appropriate combination of a heating element and heating unit, including but not limited to, electric coils, heated fluid or hydraulic coils, heated air coils, or any type of convective or conductive heating element may be utilized to heat the hoses and all are considered within the scope of the invention.

One type of applicator which can be used to spray the combination of the mixed materials from static mixer/tube 65 and from the hose attached to the second connection in outlet area 104 of proportioner 100 is a spray gun such as, but not limited to, the Model 43P Airless Gun manufactured by the Binks company. This spray gun provides a plural component (spray and/or pour) dispensing device using a static mixing principle. The gun is provided with internal orifices and spray patterns are by nozzle selection. The output of the spray gun is dependent upon nozzle and impingement orifices in conjunction with applied fluid pressures. The gun is operated by trigger and operates under high pressure (i.e. approximately up to 3500 pounds per square inch).

The hose connected to outlet valve 110 can be through a releasable, rotatable connection. Since the heated hose need not be placed into cabinet 44, the connection can occur outside of cabinet 44 so that a maximum length of the heated hose is available to perform the desired function. The spray gun connected at the opposite end of the hose can also include an adjustable valve that allows the operator to control the flow of the mixed material received from static mixer 65 and the second outlet connection of proportioner 100. The spray gun can be provided with a handle so the operator does not have to directly contact the hose itself.

Pump 60 is preferably of the recirculating type though such is not considered limiting. In this preferred form, material or fluid can be continuously moved through valve 70, and mixed material from static mixer 65 selectively moved through valve 110, the hose connected at valve 110, and any valve provided with the applicator when each is set to an open condition or position. Valve 70 can be adjusted so that adequate pressure will be supplied to the hose attached to valve 110, when desired. Alternatively, through a switch or lever, the recirculation capability of pump 60 can be turned off and/or valve 70 closed, such that the material from tank 26 is only sent to static mixer 65 for mixing with the material received through hose 82.

Cabinet 44 is preferably provided with an access door 98 to provide easy access to the interior area of cabinet 44 and the various components contained within. Because contents flowing through pipe/hose configuration 120 should be heated, the location of the configuration is disposed within heated and insulated cabinet 44.

Storage racks or braces 160 can be provided along the sides of system 10 to store or house the various hoses used with the system during transit or when the system is not in use. The vertical height of racks 160 can be positioned such that the fenders 17 covering wheels 16 attached to frame 12 can also be used to provided support to the hoses stored within racks 160. System 10 can be provided with various meters, gauges, controls, thermometers, etc. to monitor the various components and materials at various locations within system 10 and/or operate the components of system 10. A control box 180, which can be powered by the generator, can provide at least some of the controls for operating system 10 and/or electrical outlets for energizing the heated hose(s).

In one use of application system 10 according to the teachings of the present invention, a first material is heated in tank 26. Once the material has reached a sufficient temperature, pump 60 will begin to recirculate or draw out the liquefied material and send such material to static mixer 65 for mixing with a second material which has been supplied in a predetermined portion from proportioner 100. The mixed material is forwarded through a heated hose as a first input to the user operated applicator (e.g. spray gun). A second input to the applicator is provided directly from proportioner in its predetermined portion. The heated hose is coupled or connected to an electrical outlet powered by the generator which is run by engine 18 so that electrical current is supplied to the heating element surrounding the hose.

Through the use of a trigger on the applicator, the operator opens a valve in the applicator, to allow the combined material from both inlets to flow through onto the desired substrate or surface. During periods of non-use (i.e., between applications or while moving to a new location), the operator may simply leave the hose unattended, as the heating coils surrounding the hose will prevent solidification of the combined material. Alternatively, the first and second inlets to the applicator can be closed and the third inlet (solvent line), associated with a cleaning material, can be opened to clean the applicator. For extended periods of non-use, the various hoses are wrapped around system 10 in conjunction with storage racks 160.

When using application system 10 to create a rubber sealant membrane, the polyol can be the material fed through hose 82 to static mixer 65 and the bituminous material is heated within tank 26 to its molten temperature. Through plumbing configuration 120, these materials are mixed together in static mixer 65 to form a reagent mixture. The isocyanate is the material fed to the applicator directly from proportioner 100. The reagent mixture is carried separately from the isocyanate to the mixing head of the applicator by a heated hose attached to outlet valve 110. At the mixing head, the reagent mixture and isocyanate are mixed. The polyurethane prepolymer forms as the reagent material and isocyanate mix. These materials can be metered and are sprayed under pressure through a suitable spray apparatus, such as, but not limited to, the spray gun discussed above. Thus the three components are mixed together immediately before spraying, and the resultant composition can be sprayed onto various different substrates. System 10 initiates an in situ polymerization reaction at the spraying device by mixing the materials intensely so that a three-dimensional, semi-interpenetrating network molecular structure formation begins. The properties of the resulting three-dimensional matrix can be controlled by changing the formulation, such as by changing the ratio on proportioner 100. By increasing the proportion of cross-linking agents such as diisocyanate, the strength of the product is increased. By reducing the proportions of cross-linking agents, the flexibility of the materials can be increased. Thus, the system 10 provides a novel pumping, metering, mixing, and spraying system.

The heated hose can preferably run from anywhere between approximately 0° F. and approximately 350° F., and preferably approximately 325° F. The temperature of tank 26 is preferably between approximately 0° F. and approximately 500° F., and preferably approximately 340° F. The temperature of heated cabinet 44 is preferably approximately 300° F. None of these temperatures and ranges are considered limiting. Furthermore, system 10 is not intended for use for any single purpose and can be used for a variety of purposes and applications. Additionally, system 10 is not limited to the use of three separate materials. Accordingly, system 10 can be used with a single material either fed from proportioner 100 or tank 26, two materials, three materials, and other combinations, all are considered within the scope of the invention. Additionally, system 10 is not limited to any particular types of materials.

It should be also recognized that many of the hoses used for system 10 could also be tubing or rigid or flexible pipes or piping. Likewise many of the pipes or piping could also be hoses. Thus, the invention is not limited to any one specific type of fluid or material transporter and use of words such at tubing, pipes, hoses, fluid or material lines, lines, etc. throughout the application and claims are considered to be broadly interpreted to encompass all types of fluid or material transporters.

The instant invention that has been shown and described herein is considered to be the most practical and preferred embodiment. It is recognized, however, that departures may be made therefrom within the scope of the invention and that obvious modifications will occur to a person skilled in the art.

What is claimed is:

1. An applicator system for melting, mixing and applying a composition consisting of one or more materials, said applicator system comprising:

a tank having a material receiving area;

means for heating said tank to sufficiently melt a material disposed within the material receiving area;

a cabinet receiving heat from said means for heating, said tank externally located from said cabinet;

means for removing melted material from said tank;

means for supplying a second material and a third material;

means for mixing the second material with the melted material; and an applicator receiving the mixed second material and melted material from said means for mixing and the third material from said means for supplying.

2. The applicator system of claim 1 wherein said applicator is a plural component spray gun.

3. The applicator system of claim 1 further including means for controlling the amount of heat received within said cabinet.

4. An applicator system for melting, mixing and applying a composition consisting of one or more materials, said applicator system comprising:

a tank having a material receiving area;

a heating system surrounding a majority portion of said tank to sufficiently melt a material disposed within the material receiving area;

an insulated cabinet receiving heat from said means for heating;

means for controlling the amount of heat received within said insulated cabinet;

a pump and valve assembly in communication with said tank, said pump removing melted material from said tank;

a proportioner, said proportioner supplying a second material to the insulated cabinet and a third material;

means for mixing the second material with the melted material; and an applicator receiving the mixed second material and melted material from said means for mixing and the third material from said means for supplying;

wherein said proportioner providing supplying the second material and the third material in a predetermined ratio with respect to each other.

5. The applicator system of claim 1 wherein said applicator is a plural component spray gun.

6. The applicator system of claim 4 wherein said means for mixing comprises:

a preheater disposed within said insulated cabinet, said preheater having an inlet and an outlet, said preheater communicating with said proportioner through a first line connected between the inlet of said preheater and a first outlet of said proportioner;

a mixing block in communication with said preheater through a second line connected between the outlet of said preheater and an inlet of said mixing block, said mixing block also in communication with said means for removing, said mixing block receiving and mixing the melted material received from said mean for removing and the second material received through said preheater; and a static mixer in communication with an outlet of said mixing block for transporting the mixed material;

wherein said pump and valve assembly, said static mixer, said mixing block and said preheater are all disposed within an interior area of said insulated cabinet.

7. The applicator system of claim 6 wherein the mixed material is transported from said static mixer to the applicator through a heated hose connected to one end of said static mixer and to an inlet of said applicator.

8. The applicator system of claim 6 wherein the second line includes a check valve to prevent the melted material from entering the second line.

9. The applicator system of claim 6 wherein said mixing block includes a check valve to prevent the second material from entering said means for removing.

10. The applicator system of claim 6 wherein said preheater is a series of tubes in communication with each other.

11. An applicator system for melting, mixing and applying a composition consisting of one or more materials, said applicator system comprising:

a tank having a material receiving area;

a heating system surrounding a majority portion of said tank to sufficiently melt a material disposed within the material receiving area;

an insulated cabinet receiving heat from said means for heating;

means for controlling the amount of heat received within said insulated cabinet;

a pump and valve assembly in communication with said tank, said pump removing melted material from said tank;

a proportioner, said proportioner supplying a second material to the insulated cabinet and a third material;

means for mixing the second material with the melted material; and an airless spray gun receiving the mixed second material and melted material from said means for mixing and the third material from said means for supplying;

wherein said proportioner providing supplying the second material and the third material in a predetermined ratio with respect to each other.

12. The applicator system of claim 11 wherein said means for mixing comprises:

a preheater disposed within said insulated cabinet, said preheater having an inlet and an outlet, said preheater communicating with said proportioner through a first line connected between the inlet of said preheater and a first outlet of said proportioner;

a mixing block in communication with said preheater through a second line connected between the outlet of said preheater and an inlet of said mixing block, said mixing block also in communication with said means for removing, said mixing block receiving and mixing the melted material received from said mean for removing and the second material received through said preheater; and a static mixer in communication with an outlet of said mixing block for transporting the mixed material;

wherein said pump and valve assembly, said static mixer, said mixing block and said preheater are all disposed within an interior area of said insulated cabinet;

wherein the second line includes a check valve to prevent the melted material from entering the second line;

wherein said mixing block includes a check valve to prevent the second material from entering said means for removing.

13. The applicator system of claim 12 wherein the mixed material is transported from said static mixer to the applicator through a heated hose connected to one end of said static mixer and to an inlet of said applicator.

14. The applicator system of claim 13 wherein said preheater is a series of tubes in communication with each other.

15. An applicator system for melting, mixing and applying a composition consisting of one or more materials, said applicator system comprising:

a tank having a material receiving area;

means for heating said tank to sufficiently melt a material disposed within the material receiving area;

a cabinet receiving heat from said means for heating;

means for removing melted material from said tank;

means for supplying a second material and a third material;

means for mixing the second material with the melted material; and an applicator receiving the mixed second material and melted material from said means for mixing and the third material from said means for supplying;

wherein said means for supplying is a proportioner which supplies the second material and the third material in a predetermined ratio.

16. An applicator system for melting, mixing and applying a composition consisting of one or more materials, said applicator system comprising:

a tank having a material receiving area;

means for heating said tank to sufficiently melt a material disposed within the material receiving area;

a cabinet receiving heat from said means for heating;

means for removing melted material from said tank;

means for supplying a second material and a third material;

means for mixing the second material with the melted material; and an applicator receiving the mixed second material and melted material from said means for mixing and the third material from said means for supplying;

wherein said means for mixing comprises:

a preheater disposed within said cabinet, said preheater having an inlet and an outlet, said preheater communicating with said proportioner through a first line connected between the inlet of said preheater and a first outlet of said proportioner;

a mixing block in communication with said preheater through a second line Connected between the outlet of said preheater and an inlet of said mixing block, said mixing block also in communication with said means for removing, said mixing block receiving and mixing the melted material received from said mean for removing and the second material received through said preheater; and a static mixer in communication with an outlet of said mixing block for transporting the mixed material;

wherein said static mixer, said mixing block and said preheater are all disposed within an interior area of said cabinet.

17. The applicator system of claim 16 wherein the mixed material is transported from said static mixer to the applicator through a heated hose connected to one end of said static mixer and to an inlet of said applicator.

18. The applicator system of claim 16 wherein the second line includes a check valve to prevent the melted material from entering the second line.

19. The applicator system of claim 16 wherein said mixing block includes a check valve to prevent the second material from entering said means for removing.

20. The applicator system of claim 16 wherein said preheater is a series of tubes in communication with each other.

* * * * *